Nov. 18, 1952  A. S. ODEVSEFF  2,618,348
CONTROLLABLE PITCH PROPELLER SPACED BEARING ASSEMBLY
Filed June 2, 1948  7 Sheets-Sheet 1

INVENTOR.
ALEC S. ODEVSEFF
BY
ATTORNEY

Nov. 18, 1952     A. S. ODEVSEFF     2,618,348
CONTROLLABLE PITCH PROPELLER SPACED BEARING ASSEMBLY
Filed June 2, 1948        7 Sheets-Sheet 3

*INVENTOR.*
ALEC S. ODEVSEFF
BY
ATTORNEY

Nov. 18, 1952 A. S. ODEVSEFF 2,618,348
CONTROLLABLE PITCH PROPELLER SPACED BEARING ASSEMBLY
Filed June 2, 1948 7 Sheets-Sheet 4

*INVENTOR.*
ALEC S. ODEVSEFF
BY
*ATTORNEY*

Nov. 18, 1952 A. S. ODEVSEFF 2,618,348
CONTROLLABLE PITCH PROPELLER SPACED BEARING ASSEMBLY
Filed June 2, 1948 7 Sheets-Sheet 5

INVENTOR.
ALEC S. ODEVSEFF
BY
*Philip S. W. Bean.*
ATTORNEY

Nov. 18, 1952 A. S. ODEVSEFF 2,618,348
CONTROLLABLE PITCH PROPELLER SPACED BEARING ASSEMBLY
Filed June 2, 1948 7 Sheets-Sheet 6

INVENTOR.
ALEC S. ODEVSEFF
BY
*Philip S. McLean*
ATTORNEY

Nov. 18, 1952     A. S. ODEVSEFF     2,618,348
CONTROLLABLE PITCH PROPELLER SPACED BEARING ASSEMBLY
Filed June 2, 1948     7 Sheets-Sheet 7

INVENTOR.
ALEC S. ODEVSEFF
BY
ATTORNEY

Patented Nov. 18, 1952

2,618,348

UNITED STATES PATENT OFFICE 2,618,348

CONTROLLABLE PITCH PROPELLER SPACED BEARING ASSEMBLY

Alec S. Odevseff, Wichita, Kans., assignor to Beech Aircraft Corporation, Wichita, Kans., a corporation of Delaware Application June 2, 1948, Serial No. 30,637

5 Claims. (Cl. 170—160.38)

The invention here disclosed relates to variable pitch propellers, particularly for aircraft.

Objects of the invention are to provide pitch control mechanism of simple, sturdy construction, consisting of but few parts and taking up small space and of such design that it may be disposed wholly within the hub portion of the propeller.

Important objects of the invention are to provide such mechanism in a rigid form of construction capable of carrying all loads without distortion and adapted to impart the same pitch to each blade.

In the accomplishment of the last mentioned object, it is a purpose of the invention to eliminate slack or any need for slack or lost motion in any of the motion transmitting parts of the mechanism.

Important objects of the invention also are to provide mechanism of the character indicated capable of being quickly and easily assembled and disassembled.

It is an object of the invention also to provide improved pitch control mechanism which can be produced, assembled and serviced at low cost.

Further objects of the invention are to provide pitch control mechanism with fully enclosed lubrication and which will be protected against loss of lubricant.

Further special objects of the invention are to provide practical and highly desirable pitch control mechanism in a form which may be operated as desired, either mechanically or hydraulically and under electrical, automatic, manual or other control.

Other desirable objects and the novel features through which all purposes of the invention are attained are set forth or will appear in the course of the following specification.

The drawings accompanying and forming part of the specification illustrate certain present preferred embodiments of the invention. Structure and arrangement, however, may be modified and changed as regards the immediate illustration, all within the true intent and broad scope of the invention as hereinafter defined and claimed.

Fig. 1 in the drawings is a broken and substantially central longitudinal sectional view through the hub of a mechanically actuated form of the invention, substantially on the line 1—1 of Fig. 3, in which power for pitch changing adjustments is supplied by an electric motor;

Figure 2:
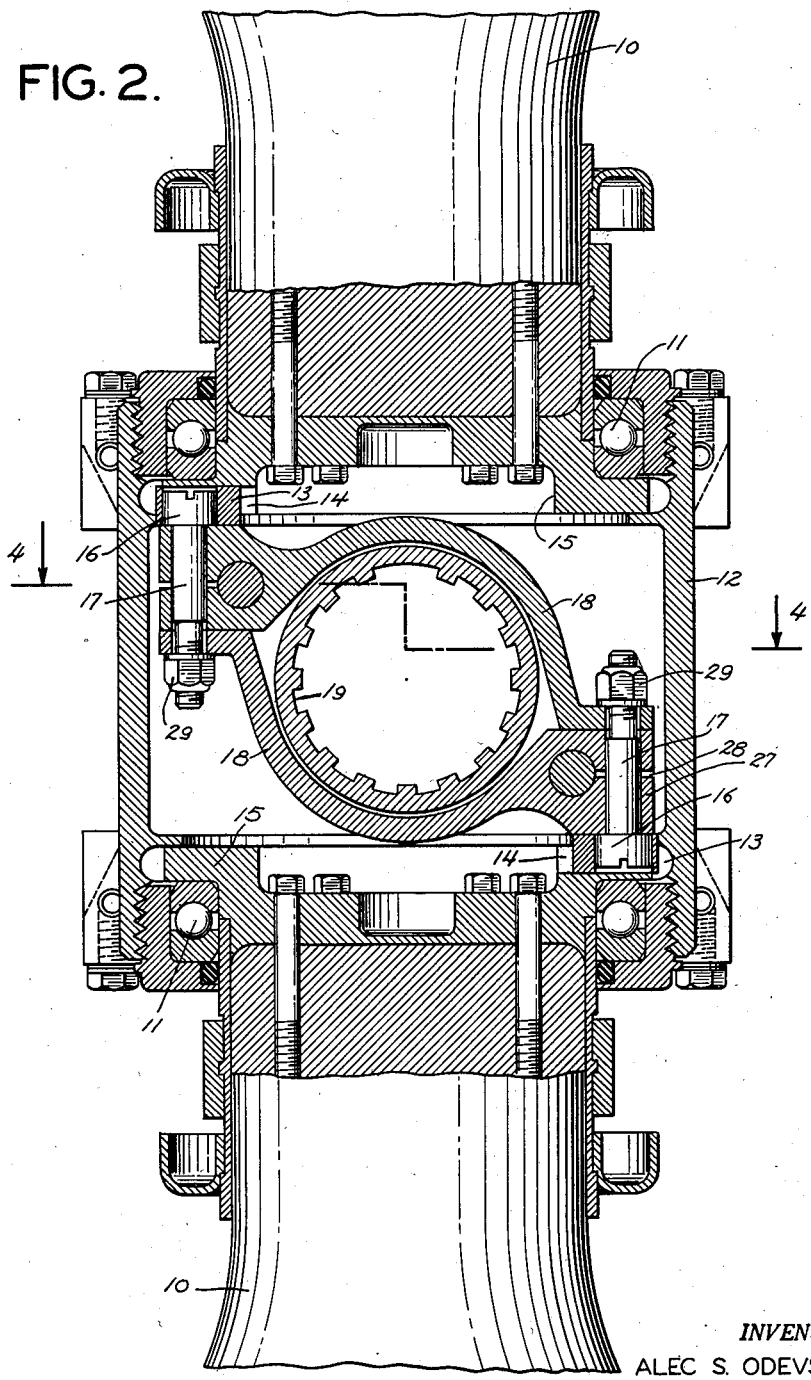
Fig. 2 is a broken transverse sectional view of the structure.

In the several views the blades 10 of the propeller are shown rotatably supported by bearings 11 in the hub body 12 and adjusted axially through the medium of slide blocks 13, Fig. 2, engaged in radial slots 14 in the inner ends of the propeller retaining rings 15.

The blocks 13 thus serve, in effect, as sliding crank pins for rotating the blades to various selected pitch angles. They are shown as pivotally engaged over the heads 16 of bolts 17 which fasten the ends of companion yoke segments 18 together about the central sleeve portion of the hub.

Figure 1:
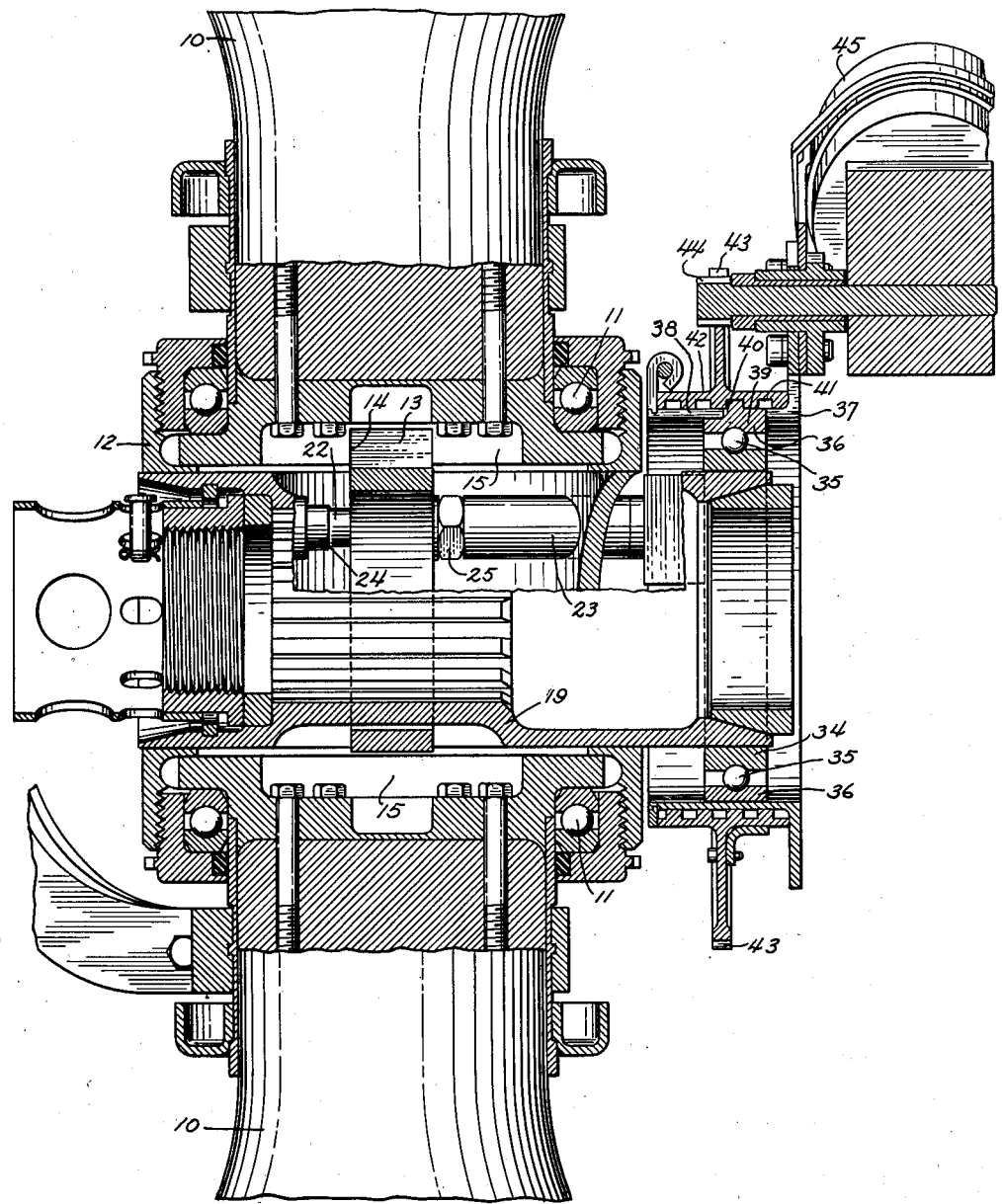

In the first illustrated embodiment, Figs. 1 and 2, the central tubular member is the drive sleeve 19 which is splined to fit the drive shaft of the engine.

In the hydraulically operated forms of the invention illustrated in Figs. 5 to 11 the propeller has a flanged mounting and the central drive sleeve 20 is therefore part of the mounting flange 21.

In all forms of the invention the pitch changing yoke which directly actuates the blades is supported between sliding bearings in the hub in the space immediately surrounding the central drive sleeve closely adjoining the inner ends of the blades.

Also, in all forms of the invention the sliding bearings are provided by rigidly connected parallel push-rods.

These rods are shown at 22, sliding at their opposite ends in inner and outer bearing sleeves 23, 24, in the hub 12 in parallel relation at diagonally opposite sides of the drive sleeve. This diagonal arrangement, as shown in Fig. 2, brings the rods close to the inner ends of the blades and the thrust transmitting bolts 17 close to the rods.

Figure 4:
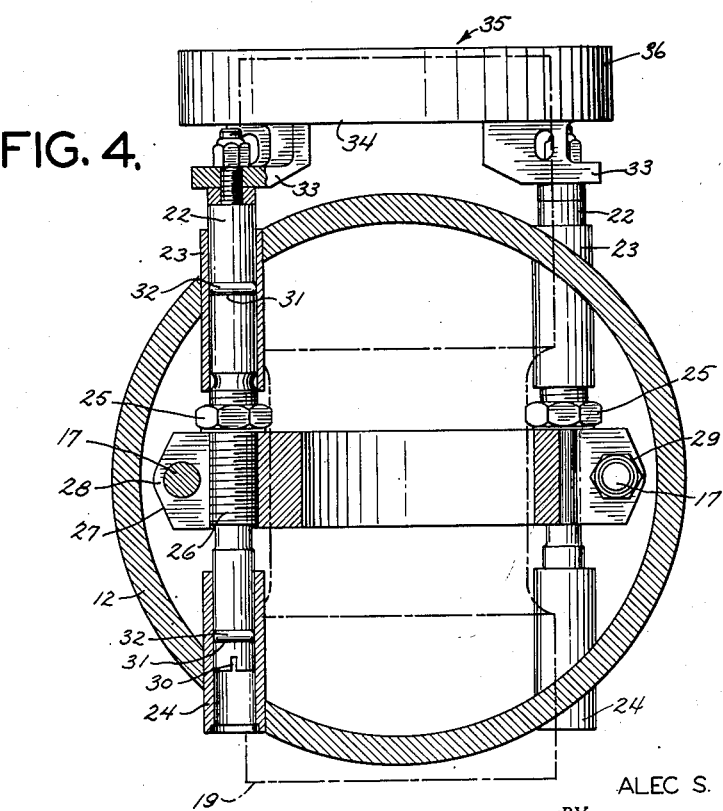
Fig. 4 is a broken longitudinal sectional view as on substantially the plane of line 4—4 of Fig. 2.

The inner ends of the bearing sleeves 23, 24, are spaced far enough apart for full movement of the yoke supported on the rods between these bearings and, in the case illustrated, Fig. 4, for clearance of the lock nuts 25 which secure the yoke in adjusted relation on the intermediate screw threaded portions 26 of the rods.

In a preferred construction, each of the segments forming the thrust yoke has a thickened end portion, as indicated at 27, screw threaded to receive the screw threaded intermediate portion 26 of one of the rods and split through at the outer side at 28 to provide a split spring screw seat which will be gripped upon the rod when the nut 29 of the through bolt 17 is set up tight.

The push-rods 22 are shown in Fig. 4 as having slotted outer ends 30, enabling them to be turned by a screwdriver or other tool for effecting relative adjustments of the yoke longitudinally on the rods and for assuring true parallel relation of the rods and their free sliding operation in the longitudinally spaced bearings. Such adjustments as may be necessary can be readily effected through the outer end of the hub after the rod clamping nuts 29 and lock nuts 25 have been released.

To prevent leakage and loss of lubricant at the slide bearings, the rods 22 are shown as having annularly grooved portions 31 carrying packing rings 32 operating within the bearing sleeves 23, 24.

Figure 3:
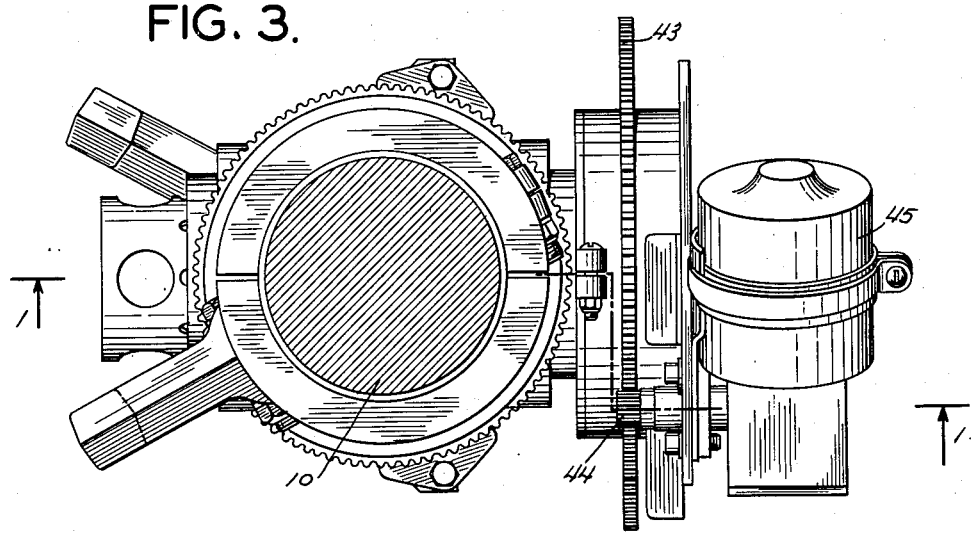
Fig. 3 is a plan view of the mechanism, with the top propeller blade appearing in section.

In the splined shaft mounting form of the invention first illustrated, the push-rods 22 are connected at their inner ends with lugs or brackets 33, Fig. 4, attached to the inner ring 34 of a ball bearing 35, Fig. 1, having an outer ring 36 piloted for non-rotary, straight, longitudinal movement in a stationary mounting sleeve or housing 37. The latter is shown as having a longitudinal slot 38 slidingly receiving a guide lug 39 projecting from the outer bearing ring 36, and this lug is shown as carrying a projection 40 operating in a helical screw groove 41 on the inside of a sleeve 42 rotating on the fixed support 37 and carrying a gear 43 engaged by a drive pinion 44. The latter is shown in Figs. 1 and 3 as operated by an electric motor 45.

It will be observed that with operation of electric motor 45 pinion 44 will turn the gear 43 on its stationary support 37 and that then the internal screw thread 41 in the hub of this gear will shift the outer bearing ring 36 longitudinally within support 37.

The inner bearing ring 34 rotating with the hub will then be advanced longitudinally with the outer bearing ring to shift the rods 22 outward or inward in the hub to cause the yoke 18, through the slide shoes 13, to impart similar pitch adjusting movements to the blades.

The thrust yoke 18 is a rigid ring, rigidly holding the slide rods in spaced relation and guided by these spaced parallel rods in accurately maintained alignment between closely adjacent bearings at opposite sides of the same. In this rigid relationship the parts are maintained in free sliding mounting clear of binding or twisting effect and requiring but little effort to apply the pitch changing adjustment to the blades. The parts can be made to fit accurately and closely to avoid any slap or lost motion which might lead to any difference in pitch between blades.

Figure 5:
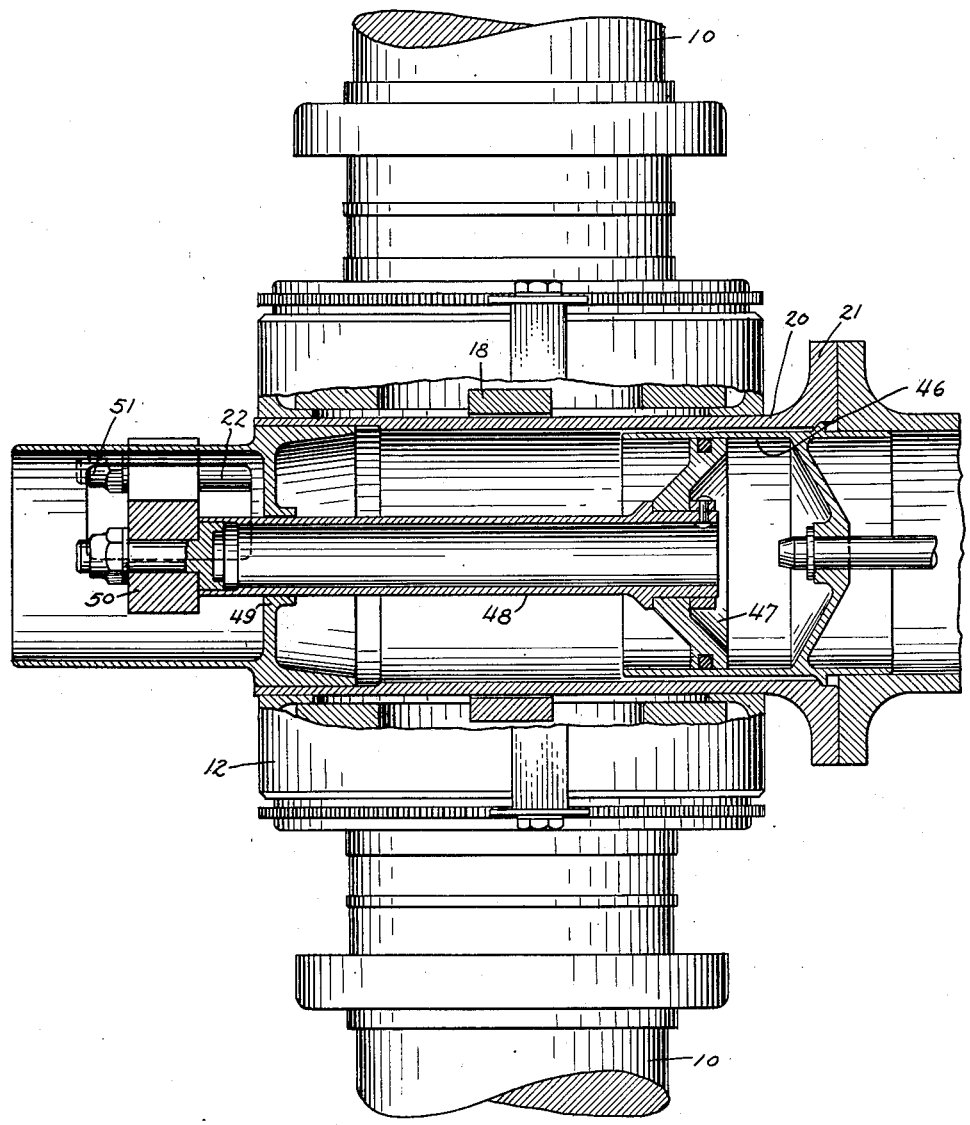
Figs. 5 and 6 are broken longitudinal and transverse sectional views of a hydraulically operated form of the invention.
Figure 6:
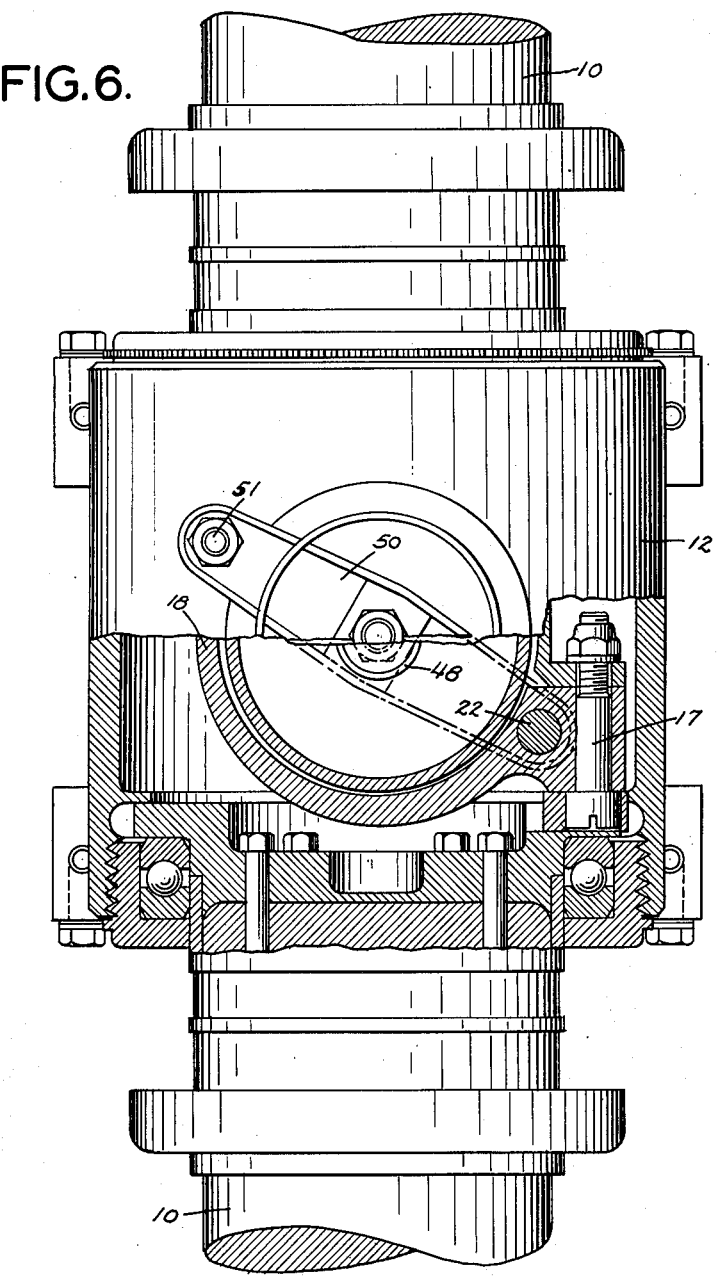
Figure 7:
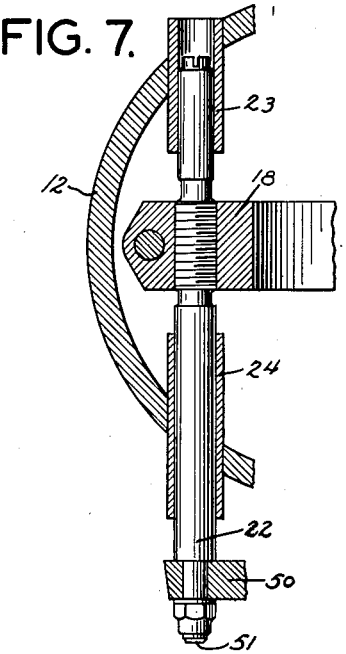
Fig. 7 is a broken sectional detail illustrating the yoke connection between the forward end of the hydraulic piston and the forward ends of the thrust rods.
Figure 10:
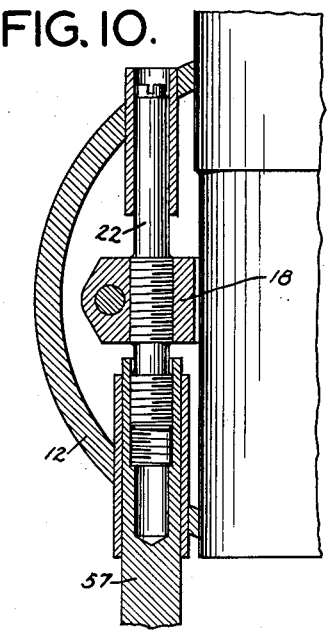
Figs. 10 and 11 are broken sectional details of the leverage connections between the piston rod and thrust rods in this latter form of the invention.
Figure 11:
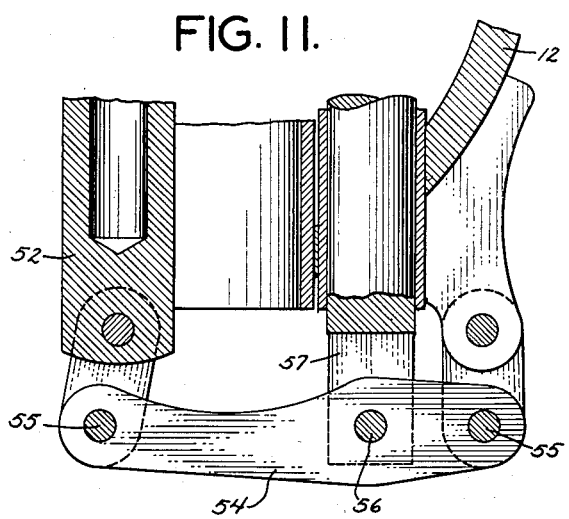
Figure 8:
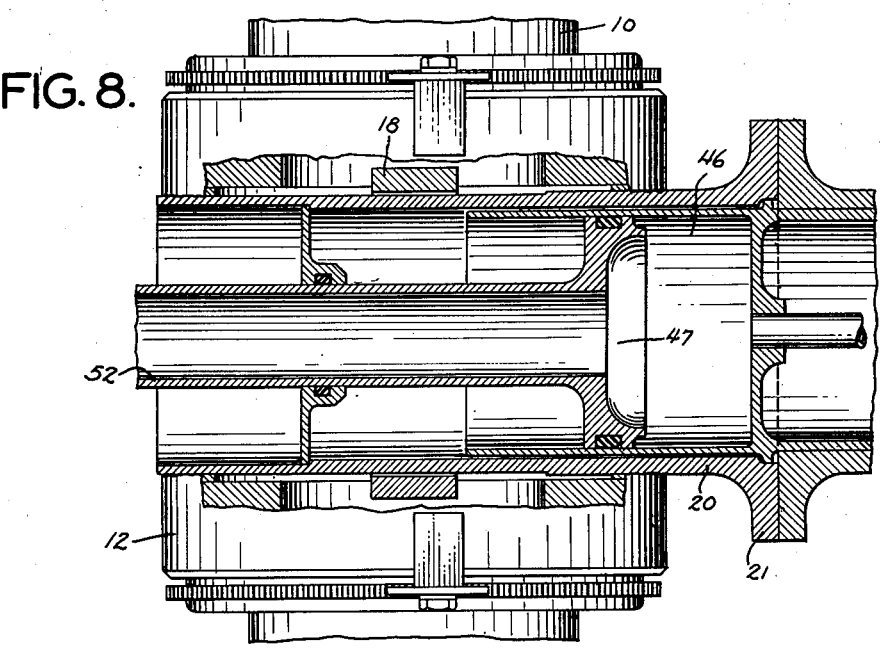
Figs. 8 and 9 are broken longitudinal and transverse sectional views, respectively, of another form of hydraulically operated mechanism.
Figure 9:
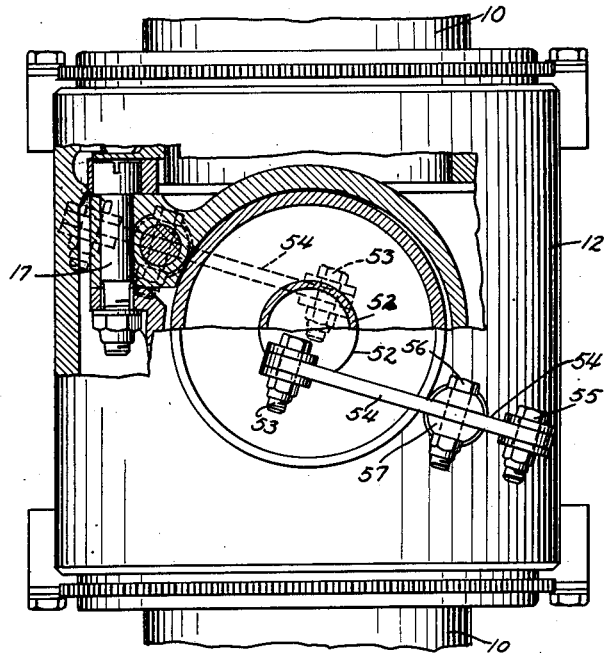

The construction disclosed is particularly suited to hydraulic operation for, as shown in Figs. 5 and 8, a hydraulic cylinder 46 may be mounted in the inner end of the hub sleeve containing a piston 47 connected with the pushrods. In Figs. 5 and 6 the hydraulic piston is shown as having a tubular piston rod 48 guided through a bearing 49 at the front and carrying a transverse yoke 50 connected with the forwardly extended end portions 51 of the push-rods 22.

This construction provides a short stroke piston having the same movement as the thrust rods.

Where greater power may be required and a longer piston stroke is permissible, a structure like that shown in Figs. 8 to 11 may be employed, wherein the forward end of the tubular piston rod 52 is shown pivoted at 53, with the longer arms of the levers 54 fulcrumed at their outer ends at 55 and pivotally connected at 56 with the extensions 57 on the forward ends of the rods 22.

In both instances the operating fluid, such as oil, may be admitted and exhausted through a single transfer line indicated at 58 in Figs. 5 and 8. Centrifugal force creates a natural tendency for the blades to go into flat pitch, applying rearward pressure on the piston. Consequently there is no need for fluid or other applied pressure on the forward side of the piston. Normally fluid pressure for pitch control is under control of the propeller governor on the engine, increasing or decreasing in pressure, as needed, to maintain the desired pitch and it is only necessary that this fluid reach the piston through the one connection shown at 58.

It will be clear that the mechanism may be operated by hand as well as by power of any sort and that control operation may be automatic or manual.

All parts of the mechanism are disposed in the space outside the central sleeve portion of the hub and hence are not restricted in size or disposition by space limitations. These parts, therefore, can be made rigid and strong enough to meet all possible requirements. Also, with the simple direct action effected, only a few parts are actually required and these each of simple, rugged design. The rods, located as they are at the outside of the central sleeve, are relatively widely spaced at opposite sides of and parallel to the axis of rotation. The elongated rigid bearings in which they operate guide and brace them in this relation. Additionally, the thrust transmitting ring which is gripped over the intermediate portions of the rods between the longitudinally separated sections of the elongated guide bearings, holds them rigidly braced in this relation, producing the effect of a light but strong, rigid slide for carrying the turning thrust from the initial operating means direct to the inner ends of the blades. The combined rotatable and sliding shoe connection between the thrust transmitting ring and blades provides simple, direct drive and leaves the inner ends of the blades free of any attached or projecting parts.

The hub constructed as illustrated, with an axial drive sleeve and a diametrically extending tubular body welded or otherwise secured where the sleeve extends through the body member, provides a light, rigid, strong structure, and the sleeve being of smaller diameter than the tubular body, provides ample space within the tubular body, at the sides of the sleeve, for the mounting of the longitudinally aligned rod guides in the forward and rearward walls of the body and the disposition of the thrust transmitting ring on the rods between these guides. As there is no crowding in this relation, all the parts can be made of ample size and shape to properly carry their respective loads.

What is claimed is:

1. A controllable pitch propeller comprising a hub having elongated bearings in spaced parallel relation at opposite sides of the hub axis, each of said bearings comprising longitudinally aligned sections separated by an intermediate space, thrust rods operating in the separated sections of said bearings and across the intermediate spaces between the sections, a thrust transmitting member mounted on intermediate portions of the rods between the longitudinally separated bearing sections, blades journaled in the hub with their inner ends closely adjoining said thrust transmitting member, blade rotating connections from said member to the inner ends of the blades and means for shifting the rods in said bearings, said thrust transmitting member having split sockets in clamping engagement over the intermediate portions of the rods and said blade rotating connections including bolts securing said split sockets over the rods and having head portions extended for operating the blades, said rods being rotatable in said bearings and having screw threaded portions engaged in said split sockets and said split sockets being screw threaded to match the screw threaded portions of the rods, whereby upon releasing the bolts clamping the split sockets on the rods and rotating the rods in the bearings, relative longitudinal adjustment of the thrust transmitting member on the rods may be effected.

2. A controllable pitch propeller comprising a hub having elongated bearings in spaced parallel relation at opposite sides of the hub axis, each of said bearings comprising longitudinally aligned sections separated by an intermediate space, thrust rods operating in the separated sections of said bearings and across the intermediate spaces between the sections, a thrust transmitting member mounted on intermediate portions of the rods between the longitudinally separated bearing sections, blades journaled in the hub with their inner ends closely adjoining said thrust transmitting member, blade rotating connections from said member to the inner ends of the blades and means for shifting the rods in said bearings, said thrust member being made in complemental segments having split sockets receiving the rods, bolts for securing the segments together and for clamping said split sockets on the rods, said bolts having portions projecting toward the inner ends of the blades and forming part of said connecting means for rotating the blades, said rods being rotatable in said bearings and having screw threaded portions engaged in the split sockets and the latter being correspondingly screw threaded so that upon releasing the bolts clamping the segments on the rods, the rods may be rotated in their bearings to effect relative longitudinal adjustment of the thrust member segments on the rods.

3. A controllable pitch propeller comprising a hub having elongated bearings in spaced parallel relation at opposite sides of the hub axis, each of said bearings comprising longitudinally aligned sections separated by an intermediate space, thrust rods operating in the separated sections of said bearings and across the intermediate spaces between the sections, a thrust transmitting member mounted on intermediate portions of the rods between the longitudinally separated bearing sections, blades journaled in the hub with their inner ends closely adjoining said thrust transmitting member, blade rotating connections from said member to the inner ends of the blades and means for shifting the rods in said bearings, said rods being rotatable in said bearings and the thrust transmitting member having screw engagement on said rods whereby relative adjustment of the rods and thrust transmitting member may be effected by rotative adjustment of the rods in said bearings.

4. A controllable pitch propeller comprising a hub having elongated bearings in spaced parallel relation at opposite sides of the hub axis, each of said bearings comprising longitudinally aligned sections separated by an intermediate space, thrust rods operating in the separated sections of said bearings and across the intermediate spaces between the sections, a thrust transmitting member mounted on intermediate portions of the rods between the longitudinally separated bearing sections, blades journaled in the hub with their inner ends closely adjoining said thrust transmitting member, blade rotating connections from said member to the inner ends of the blades and means for shifting the rods in said bearings, said rods being rotatable in said bearings and the thrust transmitting member having screw engagement on said rods whereby relative adjustment of the rods and thrust transmitting member may be effected by rotative adjustment of the rods in said bearings, and means for locking the rods and thrust transmitting member in positions of relative adjustment.

5. A controllable pitch propeller comprising a hub having elongated bearings in spaced parallel relation at opposie sides of the hub axis, each of said bearings comprising longitudinally aligned sections separated by an intermediate space, thrust rods operating in the separated sections of said bearings and across the intermediate spaces between the sections, a thrust transmitting member mounted on intermediate portions of the rods between the longitudinally separated bearing sections, blades journaled in the hub with their inner ends closely adjoining said thrust transmitting member, blade rotating connections from said member to the inner ends of the blades and means for shifting the rods in said bearings, said rods being rotatable in said bearings and the thrust transmitting member having screw engagement on said rods whereby relative adjustment of the rods and thrust transmitting member may be effected by rotative adjustment of the rods in said bearings, and means for locking the rods and thrust transmitting member in positions of relative adjustment, including bolts for clamping the member in position on the rods and the ends of said bolts being extended toward the inner ends of the blades and forming portions of said blade rotating connections.

ALEC S. ODEVSEFF.

REFERENCES CITED

The following references are of record in the file of this patent:

UNITED STATES PATENTS

| Number | Name | Date |
| --- | --- | --- |
| 1,510,436 | Englesson | Sept. 30, 1924 |
| 1,862,235 | Morris | June 7, 1932 |
| 1,942,100 | Houston | Jan. 2, 1934 |
| 2,054,810 | Gaba | Sept. 22, 1936 |
| 2,281,456 | Roby | Apr. 28, 1942 |
| 2,425,261 | Murphy et al. | Aug. 5, 1947 |
| 2,498,109 | Lathrem | Feb. 21, 1950 |

FOREIGN PATENTS

| Number | Country | Date |
| --- | --- | --- |
| 475,240 | Great Britain | Nov. 16, 1937 |
| 519,261 | Great Britain | Mar. 20, 1940 |